United States Patent [19]
Shida et al.

[11] Patent Number: 5,445,404
[45] Date of Patent: Aug. 29, 1995

[54] AXLE BEAM TYPE SUSPENSION ARRANGEMENT FOR AUTOMOTIVE VEHICLE

[75] Inventors: Kazuki Shida, Atsugi; Yuji Onda, Isehara, both of Japan

[73] Assignee: Nissan Motor Co., Ltd., Yokohama, Japan

[21] Appl. No.: 103,537

[22] Filed: Aug. 9, 1993

[30] Foreign Application Priority Data

Sep. 11, 1992 [JP] Japan .................. 4-243589

[51] Int. Cl.6 .................................................. B60G 21/00
[52] U.S. Cl. .................................................. 280/689
[58] Field of Search ............... 280/688, 689, 723, 724, 280/726, 717, 715, 673

[56] References Cited

U.S. PATENT DOCUMENTS

| | | | |
|---|---|---|---|
| 3,944,245 | 3/1976 | Kuhn | 280/724 |
| 4,445,725 | 5/1984 | Sivalka | 188/195 |
| 5,310,212 | 5/1994 | Uno et al. | 280/688 |

FOREIGN PATENT DOCUMENTS

| | | | |
|---|---|---|---|
| 53-30618 | 3/1978 | Japan . | |
| 54-111013 | 8/1979 | Japan . | |
| 60-33156 | 2/1985 | Japan . | |
| 0029406 | 2/1987 | Japan | 280/689 |
| 62-146673 | 9/1987 | Japan . | |
| 0028012 | 1/1989 | Japan | 280/688 |
| 0306309 | 12/1989 | Japan | 280/723 |
| 2-13867 | 1/1990 | Japan . | |
| 2-254006 | 10/1990 | Japan . | |

*Primary Examiner*—Mitchell J. Hill
*Assistant Examiner*—Paul N. Dickson
*Attorney, Agent, or Firm*—Foley & Lardner

[57] ABSTRACT

An axle beam type suspension arrangement for automotive vehicles is provided. This arrangement includes a vehicle superstructure having a portion projecting downwardly of a vehicle body, a panhard rod one end of which is attached to the projecting portion of the vehicle superstructure and the other to an axle beam connecting right and left rear wheels, an assist link one end of which is connected to a middle portion of the panhard rod and the other to the axle beam, and an absorbing member which is interposed between the other end of the panhard rod and the axle beam and is displaceable in the axial direction of the panhard rod to absorb a relative displacement between the panhard rod and the axle beam.

7 Claims, 5 Drawing Sheets

AXLE BEAM TYPE SUSPENSION ARRANGEMENT FOR AUTOMOTIVE VEHICLE

BACKGROUND OF THE INVENTION

1. Field of The Invention

The present invention relates generally to an axle beam type suspension arrangement for automotive vehicles.

2. Description of The Prior Art

Axle beam type suspension systems are commonly known which utilize a panhard rod connecting between an axle beam and a vehicle frame to eliminate lateral forces between a road wheel and a road surface and to minimize jack-up forces applied to the road wheel.

Japanese Patent First Publication No. 2-254006 and Japanese Utility Model First Publication No. 53-30618 disclose a typical axle beam type suspension arrangement.

Such a prior art suspension arrangement, however, encounters various drawbacks as discussed below.

In order to provide a desired length of a panhard rod, an attachment point of a panhard rod to a vehicle body is located outside and in front of a rear frame side member. The panhard rod is, therefore, subject to deformation caused by the vibration input from rear wheels and it becomes necessary to give the panhard rod high rigidity or to reinforce same with some reinforcement member.

In addition, since the attachment point of the panhard rod to the vehicle body is positioned outwardly from the rear frame side member, suspension characteristics in the lateral direction of the vehicle such as rolling characteristics are disadvantageously degraded.

When the vibration is input from the rear wheels, it is transmitted to the vehicle body through two brackets which retain the panhard rod on the vehicle body. The vibration input is concentrated at root portions of the brackets, causing deformation thereof.

Since the attachment point of the panhard rod to the vehicle body is located outside the rear frame side member and there is no reinforcement behind the attachment point of the panhard rod, when the vehicle is in involved in a rear-end collision or when the vehicle is backed and hits a curb on a road, the attachment point of the panhard rod may be damaged.

Struts are located just above the axle beam, resulting in a valuable space of a rear baggage compartment being consumed.

Furthere, lower ends of the struts are connected to portions inside trailing arms respectively. Thus, the distance between the lower ends of the struts is short and vehicle behavior is not suppressed effectively during rolling of the vehicle body.

SUMMARY OF THE INVENTION

It is therefore a principal object of the present invention to avoid the disadvantages of the prior art.

According to one aspect of the present invention, there is provided an axle beam type suspension arrangement for an automotive vehicle which comprises an axle beam supporting right and left rear wheels, a vehicle body member, constituting part of a vehicle superstructure, arranged between a pair of rear frame side members extending longitudinally of the vehicle, the vehicle body member including a portion projecting toward the axle beam, a panhard rod having first and second ends, the panhard rod being attached at the first end to the vehicle body member and at the second end to the axle beam, an assist link connected at one end thereof to a portion of the panhard rod between the first and second ends and the other end thereof to the axle beam, and an absorbing means, interposed between the second end of the panhard rod and the axle beam, for absorbing relative displacement between the panhard rod and the axle beam in a lengthwise direction of the panhard rod.

In the preferred mode, a connection between the panhard rod and the vehicle body member is located within a preselected range around a central portion of the vehicle in a transverse direction thereof. The vehicle body member is of inverted triangular shape.

Additionally, a connection between the panhard rod and the vehicle body member may be located within a range defined by lines extending in a longitudinal direction of the vehicle through a periphery of a spare pan provided behind the axle beam for storing therein a spare tire. Right and left struts are further provided which are attached at upper ends thereof to upper ends of right and left strut housings formed on a floor panel and which are secured at lower ends thereof to the axle beam, a connection between the panhard rod and the vehicle body member transversely may align with both connections between the upper ends of the struts and the strut housings. In addition, the connection between the panhard rod and the vehicle body member and both the connections between the struts and the strut housings may be arranged frontwardly from the axle beam. The lower ends of the struts may be located outside right and left trailing arms disposed on the axle beam.

Right and left trailing arms are provided which are attached at front ends thereof to the rear frame side members and at rear ends thereof to the axle beam. Brake cables are provided which transmit operational force applied from a brake operating means to brake units respectively and which are arranged outside the trailing arms along lengths of the trailing arms respectively.

An exhaust pipe for directing exhaust gas rearward of the vehicle may extend through a space defined between the vehicle body member and the panhard rod and be located between the end of the assist link and one of the rear frame side members. A filler tube connected to a fuel tank through a flexible horse and a filler tube bracket retaining the filler tube are provided. The filler tube may extend through a space defined among one of the rear frame side member and be arranged at a location opposite the panhard rod with respect to the center line of the vehicle, the vehicle body member, and the axle beam. The filler tube bracket supports a portion adjacent a connection between the filler tube and the flexible horse in a manner wherein one end of the filler tube bracket is connected to one of the rear frame side members around a connection to the vehicle body member and the other end thereof to the vehicle body member.

A hydraulic control unit which controls brake hydraulic pressure for the rear wheels according to load of the vehicle may be arranged on one of tile rear frame side members around a connection to the vehicle body member.

The vehicle body member may include a cross member and a panhard rod bracket, the cross member extending in the transverse direction of the vehicle to connect the pair of rear frame side members, the panhard rod bracket is secured to the cross member along a preselected length of the cross member. The panhard rod bracket may be of inverted triangular shape.

The panhard rod may include a double walled structure at its central portion in a longitudinal direction thereof. The double walled structure may have a preselected greater width than those of the first and second ends in a vertical direction thereof. In addition, the double walled structure may also include apertures in walls respectively which aligned with each other in the longitudinal direction of the vehicle. The assist link may be disposed within the double walled structure in a manner wherein the end of the assist link is fixed on the axle beam by a bracket through one of the apertures.

DESCRIPTION OF THE PREFERRED EMBODIMENT

Figure 1:
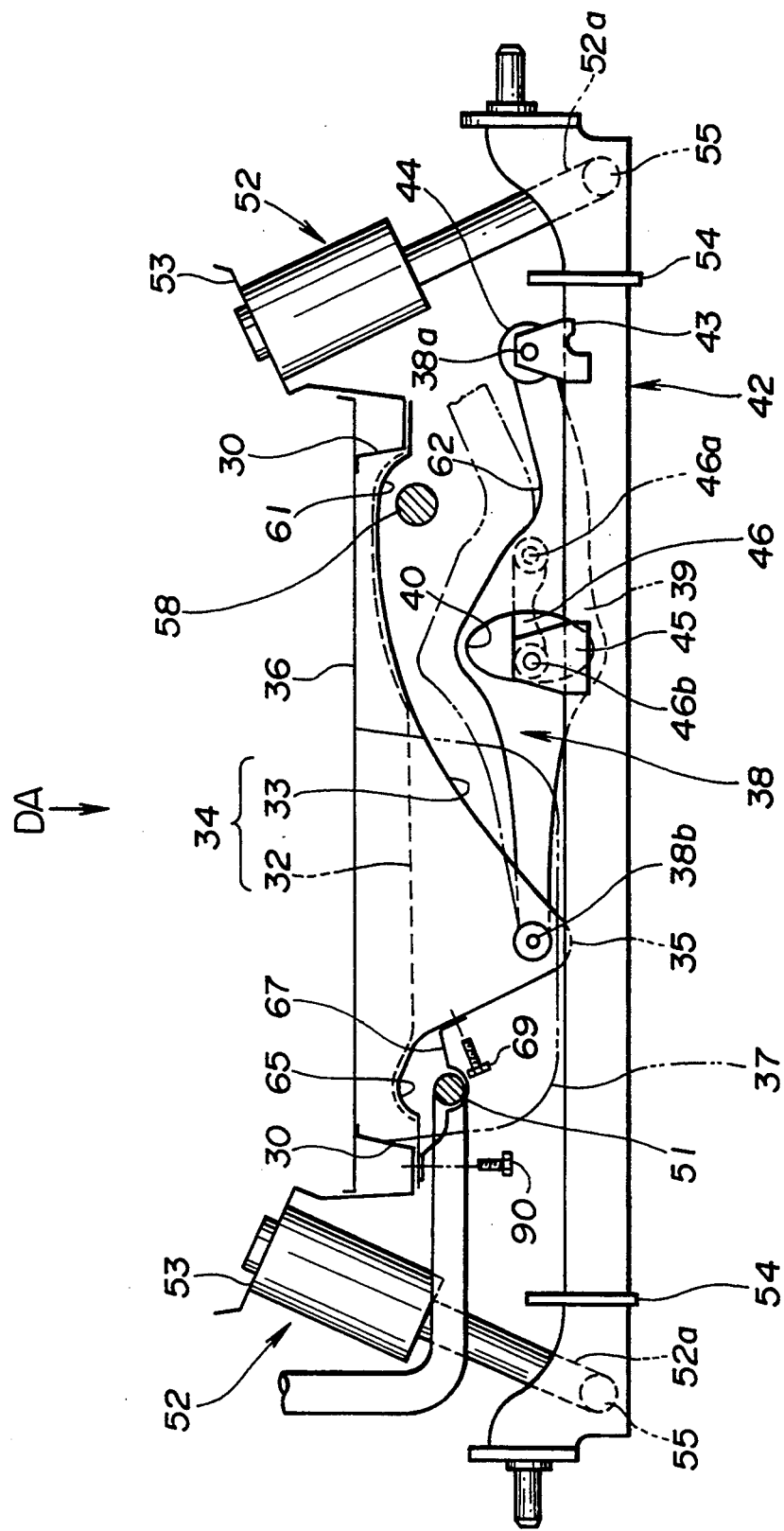
FIG. 1 is a side view which shows rear partial cross section of an axle beam type suspension arrangement for an automotive vehicle according to an embodiment of the present invention.
Figure 2:
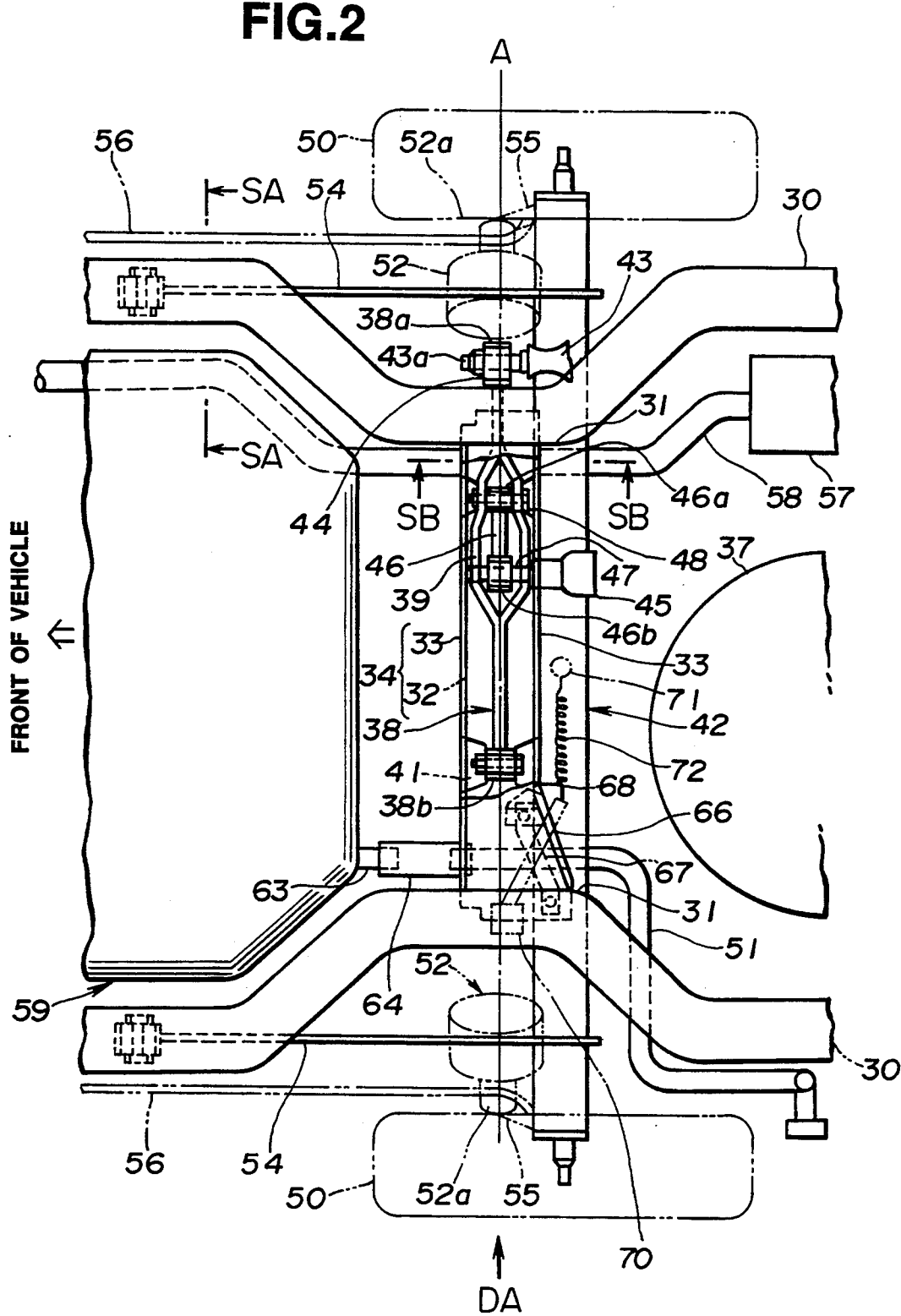
FIG. 2 is a plane view as viewed from the arrow DA in FIG. 1.

Referring now to the drawings, particularly to FIGS. 1 and 2, there is shown an axle beam type suspension arrangement for automotive vehicles according to the present invention.

Rear frame side members 30 extend longitudinally of the vehicle in the illustrated manner. The rear frame side members 30 include U-shaped portions 31 respectively which project inwardly of the vehicle, and which are connected with each other through a cross member 32 of U-shape in cross section. To both side surfaces of the cross member 32, panhard rod brackets 33 of inverted triangular shape are secured respectively along the length thereof. Each of the panhard rod brackets 33 includes a lower end portion 35 which is, as shown in FIG. 2, located a little to the left of the longitudinal center line of the vehicle and substantially on the center line longitudinally extending through the central portion of a spare pan 37 which includes a recessed portion formed in a rear floor panel 36 for storage of a spare tire.

A panhard rod 38, as shown in FIG. 2, includes a double walled section 39 which is comprised of walls projecting symmetrically in the longitudinal direction of the vehicle and which, as shown in FIG. 1, has vertically greater width forming therein longitudinally oval apertures 40 aligned with each other. The cross member 32 and the panhard rod brackets 33 complete a vehicle body member 34 (i.e., part of a vehicle superstructure). The panhard rod 38 is secured at a point 38b of attachment to the lower end portion 35 of the panhard rod bracket 83 through a bushing 41. An axle beam 42 is arranged behind the panhard rod 32 in parallel thereto. Secured to the right end of the axle beam 42 is a bracket 43 which has a supporting pin 43a for pivoting the panhard rod at a point 38a of attachment to the axle beam through an anisotropic bushing 44 serving as an absorbing member eliminating a relative displacement between the panhard rod 38 and the axle beam in a lengthwise direction thereof.

At a location on an upper surface of the axle beam 42 coinciding with the apertures 40 of the panhard rod 38, another bracket 45 is arranged to which an assist link 46 is secured at a left end 46b through a bushing 47. The right end 46a of the assist link 46 is attached to the right end of the double walled section 39 of the panhard rod 38 through a bushing 48. Usually, the panhard rod 38 and the assist link 46 are, as shown in FIG. 2, oriented horizontally so that they transmits vibration input from the axle beam 42 to the vehicle body member 34 effectively.

Figure 4:
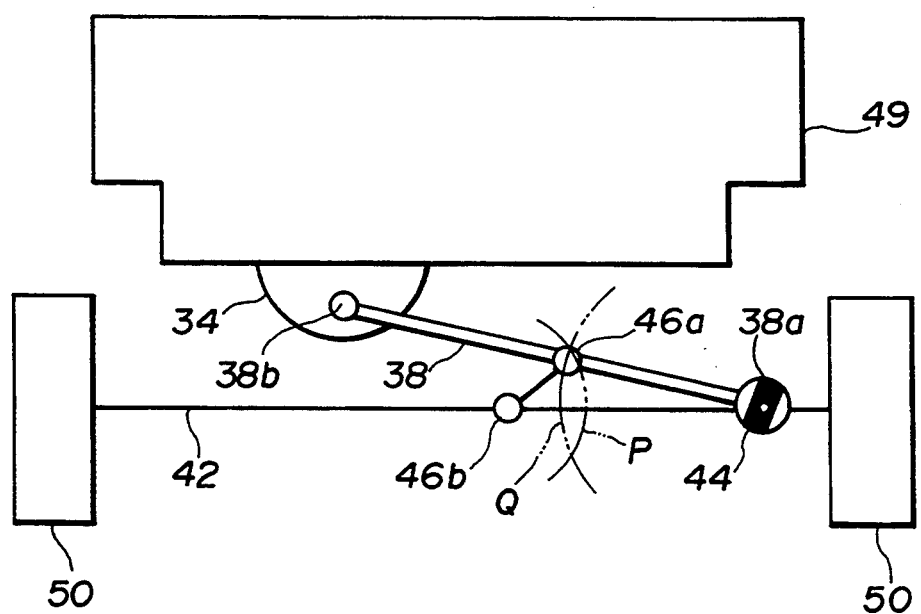
FIG. 4 is an explanatory view which shows a panhard rod arrangement.

With the above arrangement wherein the assist link 46 is provided within the double walled section 39 of the panhard rod 38, the panhard rod 38 is, as shown in FIG. 4, secured to a vehicle body 49 (i.e., a frame) at a single support point (the vehicle body support point 38b) and also to the axle beam 42 at two support points (the axle beam support point 38a and the left end 46b of the assist link 46). Additionally, the provision of the anisotropic bushing 44 arranged at the axle beam support point 38a eliminates a lengthwise displacement of the panhard rod 38. The panhard rod 38 is made shorter than a conventional one. In this regard, this embodiment is different from the prior art suspension arrangement wherein a long-sized panhard rod is utilized for eliminating the lengthwise displacement thereof. Therefore, the suspension arrangement of this embodiment eliminates the need for reinforcing the panhard rod 38. Additionally, the shortening of the panhard rod 38 provides light weight construction and increases a degree of freedom for design in arranging a filler tube 51.

The reason why the above described panhard rod arrangement can restrict the lengthwise displacement thereof is as follows. For example, when the vehicle is running on an uneven road surface, on bounding and rebounding of rear wheels 50, the right end 46a of the assist link 46, as shown in FIG. 4, moves along an arc P with respect to the center point of the left end 46b connected to the axle beam 42. On the other hand, the support point of the panhard rod 38 connected to the assist link 46 (i.e., a point represents the right end 46a) draws an arc Q with respect to the center point of the axle beam support point 38a of the panhard rod 38. In other words, during bounding and rebounding of the rear wheels 50, the support points of the assist link 46 and the panhard rod 38 coincident with each other are displaced along the different loci respectively, which may cause relative displacement to occur between the assist link 46 and the panhard rod 38 in a lengthwise direction thereof. However, with the suspension arrangement of this embodiment, such displacement is absorbed by the anisotropic bushing 44 arranged at the axle beam support point 38a of the panhard rod 38.

The panhard rod arrangement, as discussed above, includes the single support point on the vehicle body member 49 and the two support points on the axle beam 42. Thus, the positional relation between the axle beam 42 and the panhard rod 38 is substantially maintained constant so that scuff variation between the vehicle body 49 and the axle beam 42 (or a road surface) may be minimized regardless of vehicle body attitude change such as rolling motion. Further, during the rolling motion, even when the rear wheels 50 bounds or rebounds and lateral forces are applied to road contacting areas of the rear wheels 50, linkage geometry of the suspension arrangement does not vary even when the vehicle rolls, thus eliminating jack-up forces inducing the vehicle body 49 to be lifted up from the vehicle body support point 38b by vertical component forces of the panhard rod 38.

Further, as described above, the vehicle body member 34 (i.e., the panhard rod brackets 33) to which the panhard rod 38 is attached is of the inverted triangular shape and a root portion thereof connected to the vehicle body 49 has greatly wide width in the transversal direction of the vehicle. Thus, with this arrangement, vibration input applied from the panhard rod 38 is transmitted to the rear frame side members 30 effectively. In addition, the vehicle body support point 38b (the lower ends 35 of the panhard rod brackets 33) of the panhard rod 38 is located more inwardly than the prior art arrangement and thus vehicle attitude change such as rolling may be balanced in the transversal direction of the vehicle body, thereby enhancing suspension performance. Moreover, the vehicle body support point 38b of the panhard rod 38 is located on the longitudinal center line of the spare pan 37 and thus the spare pan 37 may protect the vehicle body support point 38b from impact upon occurrence of a rear end collision such as when the vehicle is backed and hits curbs on a road. The position of the vehicle body support point 38b is not limited to on the longitudinal center line of the spare pan 37 and the vehicle body support point 38b may be at any position within a range defined by lines longitudinally extending through a periphery of the spare pan.

Struts (shock absorbers) 52 are arranged in alignment with the panhard rod 38 and, as shown in FIG. 1, are attached at upper ends to strut housings 53 and at lower ends 52a to forward projecting portions 55 formed on portions of the axle beam 42 outside trailing arms 54. It will be appreciated that the U-shaped curved portions 31 of the rear frame side members 30 are connected to each other in a manner wherein the support point 38b of the panhard rod 38 connected to the vehicle body member 34 and the support points of both the struts 52 connected to the strut housings 53 are, as shown in FIG. 2, located on a straight line A which extends in the transversal direction of the vehicle body through the U-shaped curved portions 31. With this arrangement, the vehicle body member 34 reinforces the rear frame side members 30 to withstand impact on a rear-end collision.

Additionally, the lower ends 52a of the struts 52 are, as mentioned above, arranged on the ends of the axle beam 42 outside the trailing arms 54 respectively. Thus, the distance between the lower ends 52a of the struts 52 is longer than the prior art arrangement so that secure vehicle handling may be established to suppress vehicle behavior variation during rolling. The support point 38b of the panhard rod 38 and both the support points of the struts 52 are provided in front of the axle beam 42, and the lower ends 52a of the struts 52 are secured to the lower portion of the axle beam 42, therefore, as different from the prior art arrangement denoted by the reference character G in FIG. 3, wherein the strut is connected at its lower end to an upper surface of the axle beam, the locations of the struts 52 as well as the strut housings 53 are lowered by a distance d so that a rear baggage compartment (i.e., a trunk) may be enlarged. The panhard rod 38 is, as stated above, much shorter than a conventional one and thus the right and left trailing arms 54 may be located inwardly in areas where the panhard rod 38 do not contact the trailing arms 54. Therefore, in this embodiment, brake cables 56 for a parking brake extend outside the trailing arms 54, respectively.

An exhaust pipe 58 which extends from an engine (not shown) mounted in a front engine compartment toward a muffler 57 is, as shown in FIG. 2, arranged close to the right rear frame side member 30. The right brake cable 56 extends along the side of the right rear frame side member 30 opposite the exhaust pipe 58. Therefore, the right trailing arm 54 serves to insulate the cable 56 from heat generated from the exhaust pipe 58.

Figure 5:
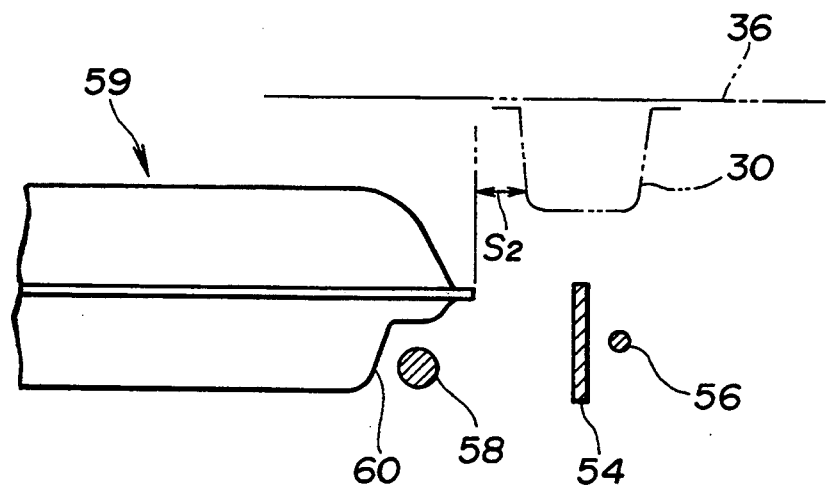
FIG. 5 is a cross sectional view as taken along the line SA—SA in FIG. 2.

Additionally, as shown in FIG. 5, with the suspension arrangement of this embodiment, the brake cables 56 do not vibrate greatly together with the trailing arms 54, and it is possible to decrease an interval $S_2$ between a fuel tank 59 and the rear frame side members 30. Thus, the fuel tank 59 may be made bigger in volume than a conventional one. Further, as described above, since the exhaust pipe 58 is arranged close to the right rear frame side member 30, a recessed portion 60 designed for preventing the fuel tank 59 from interfering with the exhaust pipe 58 may be made smaller. For these reasons, the fuel tank 59 may be designed to have a greater capacity.

Further, the right end of the vehicle body member 34, as can be seen in FIG. 1, includes an arc like portion 61. The right end portion of the panhard rod 38 also forms an arc like portion 62 to define a space in combination with the the arc like portion 61 through which the exhaust pipe 58 passes between the right end 46a of the assist link 46 and the right rear frame side member 30. Thus, the exhaust pipe 58 is prevented from contacting the panhard rod 38 during vertical displacement of the axle beam 42.

Figure 6:
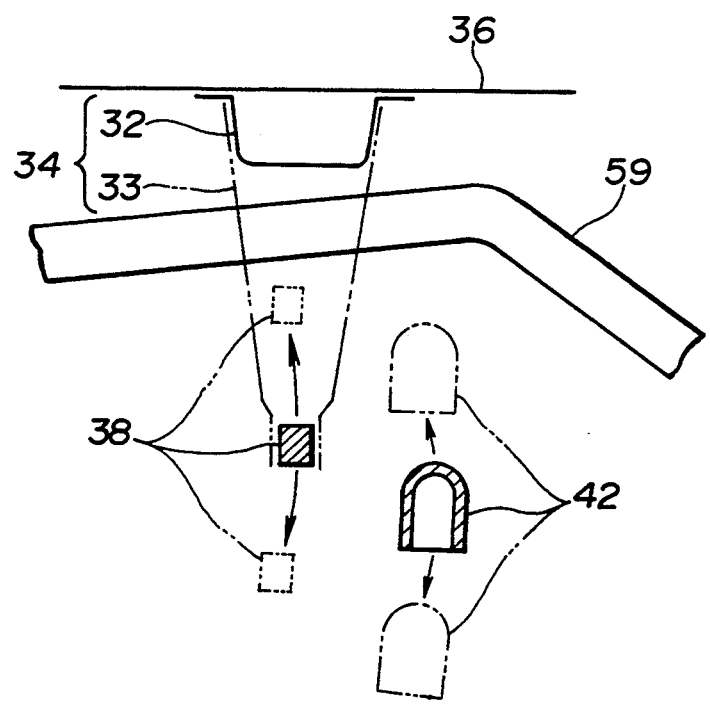
FIG. 6 is a cross sectional view as taken along the line SB—SB in FIG. 2.

In the event that the axle beam 42 is displaced vertically due to bounding motion of the vehicle body 49, the axle beam support point 38a of the panhard rod 38 moves as much as the axle beam 42. However, as the panhard rod 38 pivots with respect to the vehicle body support point 38b, the right end 46a of the assist link 46 moves by about one-half (½) of the amount of the vertical displacement of the axle beam 42. Additionally, the anisotropic bushing 44 is placed on the axle support point 38a and the panhard rod 38 is arranged to be shifted to the right, as viewed in the drawing, during bounding so that the left end 46b of the assist link 46 is displaced as much as the axle beam support point 38a, thereby causing the left end 46b of the assist link 46 to be moved vertically as much as the displacement of the axle beam 42. Therefore, when the axle beam 42 is displaced vertically, as shown by an imaginary line in FIG. 6, due to bounding of the rear wheels 50, a place where the amount of displacement is the smallest is a portion around the right end 46a of the assist link 46. Therefore, a large space is obtainable between the vehicle body member 34 and the panhard rod 38 and it is possible to define the space between the arc like portions 61 and 62 required for preventing the exhaust pipe 58 from hitting the axle beam 42 during relative displacement between the axle beam 42 and the vehicle body member 34. The arrangement of the exhaust pipe 58 within the large space is also advisable for assembling.

The filler tube 51 extends between the panhard rod 38 and the left rear frame side member 30 and then leads to a connecting port 63 of the fuel tank 59 through a flexible horse 64. The connecting port 63 is formed in the left of the fuel tank 59. As can be seen in FIG. 1, the filler tube 51 passes under a cut-away portion 65 of the vehicle body member 34 to avoid the vehicle body member 34 from hitting the filler tube 51 during the relative displacement between the axle beam 42 and the vehicle body member 34. With this arrangement, the filler tube 51 may be shortened as compared with a conventional one which extends from the center of the fuel tank in the transversal direction of the vehicle.

The filler tube 51 is, as can be seen in FIG. 1, attached to the bottom surface of the left end portion of the vehicle body member 34 through a bracket 67. The left end portion of the vehicle body member 34, as shown in FIG. 2, include a tapered portion 66 having a greater width in the longitudinal direction of the vehicle for providing high rigidity. The bracket 67 is attached at its end to a flange 68 formed on the tapered portion 66 by means of a bolt 69, while the other end to the bottom of the left rear frame side member 30 by means of a bolt 90 in a manner wherein the ends of the bracket 67 are, as shown in FIG. 2, longitudinally offset from each other. This arrangement provides the mounting strength of the filler tube 51 to withstand vibration input from different directions.

Figure 7:
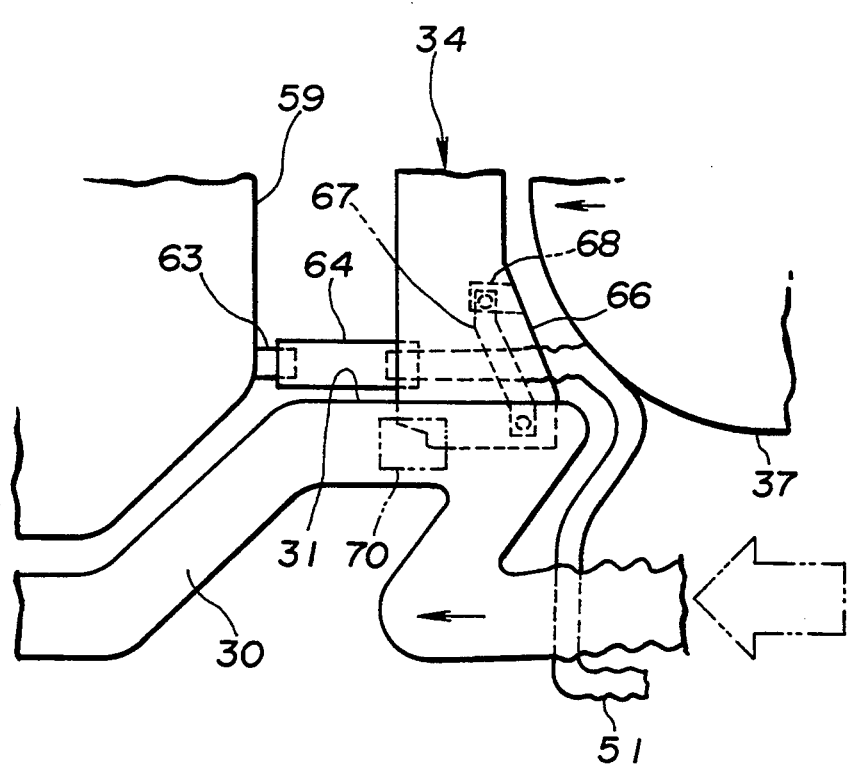
FIG. 7 is a partially enlarged plane view which shows deformed conditions around a horse connection of a filler tube.

Additionally, as shown in FIG. 7, even if the vehicle is involved in a rear-end collision and the spare span 37 is then shifted frontward, as the frontmost portion of the spare pan 37 is offset from the filler tube 51, it will not hit the filler tube 51 directly. In addition, even when portions other than the frontmost of the spare pan 37 interferes with the filler tube 51 or the rear frame side member 30 is collapsed on the rear-end collision, as the connecting portion of the filler tube 51 to the horse 64 is, as mentioned above, retained by the tapered portion 66 having relatively high rigidity, it will be prevented from being damaged.

A load sensing valve 70 (i.e., a hydraulic pressure control unit) is provided which is communicated with a brake fluid passage (not shown in the drawings) leading to brake units (not shown) of the rear wheels 50 and which is operable to control brake fluid pressure according to the amount of a stroke of the axle beam 42 indicative of vehicle load detected by a stroke sensor 71 connected with the load sensing valve through a spring 72. The stroke sensor 71 is secured on a central upper surface of the axle beam 42 for assuring measurement accuracy. When the vehicle load is relatively high, the load sensing valve 70 provides higher fluid pressure to the brake units. Alternatively, when the vehicle is empty and the vehicle load is low, lower fluid pressure is supplied to the brake units. The load sensing valve 70 is disposed on a connection, between the vehicle body member 34 and the left rear frame side member 30, which has relatively high rigidity. Thus, even if the load sensing valve 70 is shifted frontward caused by impact acting thereon on a rear-end collision, it will not hit the fuel tank 59 as being located on the left of the fuel tank 59.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, while the vehicle body member 34, as described above, includes the cross member 32 and the panhard rod bracket 33 separate from each other, it may be provided with a one-piece member. Additionally, the vehicle body member 34 may also be provided with only the panhard rod bracket.

Figure 3:
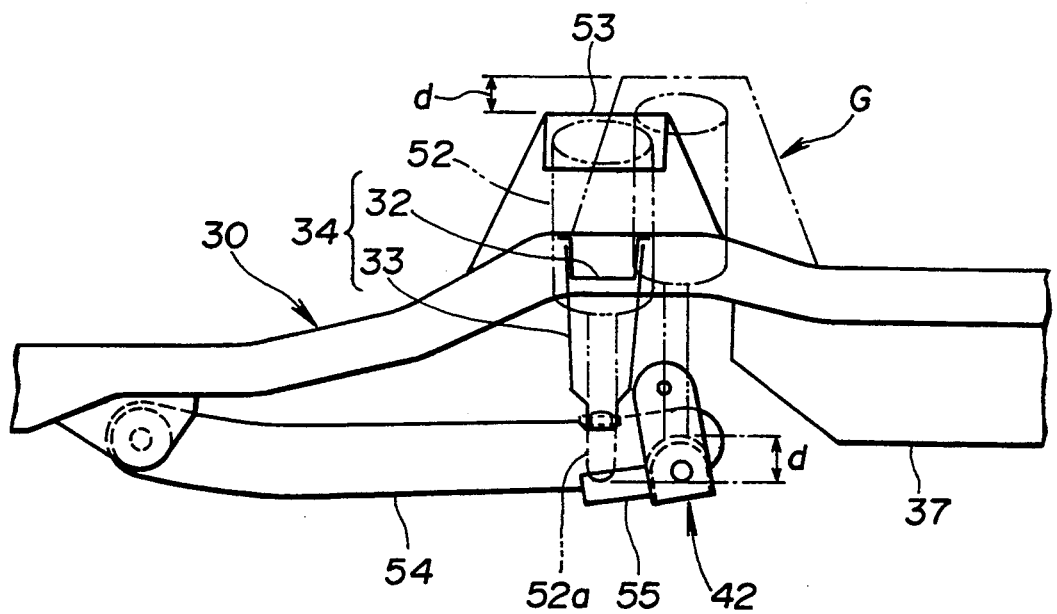
FIG. 3 is a partial side view as viewed form the arrow DB in FIG. 2.

In the above embodiment, the support point 38b of the panhard rod 38 connected to the vehicle body member 34 and both the support points of the struts 52 connected to the strut housings 53 aligned with each other are provided in front of the axle beam 42, and the lower ends 52a of the struts 52 are installed on the lower portion of tile axle beam 42. It should be noted however, that even when the lower ends 52a of the struts 52 are secured on the upper end of the axle beam 42, the height reduction d, as shown in FIG. 3, is obtainable by orienting the struts 52 in an inclined position.

What is claimed is:

1. An axle beam suspension arrangement for an automotive vehicle comprising:

an axle beam supporting right and left rear wheels;

a vehicle body member of an inverted triangular shape, constituting part of a vehicle superstructure, arranged between a pair of rear frame side members extending longitudinally of the vehicle, said vehicle body member including a portion projecting toward said axle beam;

a panhard rod having first and second ends, said panhard rod being attached at the first end to said vehicle body member and at the second end to said axle beam, a connection between said panhard rod and said vehicle body member being located within a preselected range around a central portion of the vehicle in a transverse direction thereof and also within a range defined by lines extending in a longitudinal direction of the vehicle through a periphery of a spare pan provided behind said axle beam for storing therein a spare tire;

an assist link connected at one end thereof to a portion of said panhard rod between the first and second ends and the other end thereof to said axle beam;

absorbing means, interposed between the second end of said panhard rod and said axle beam, for absorbing relative displacement between said panhard rod and said axle beam in a lengthwise direction of said panhard rod; and right and left struts which are attached at upper ends thereof to upper ends of right and left strut housings formed on a floor pan and which are secured at lower ends thereof to said axle beam, a connection between said panhard rod and said vehicle body member being transversely aligned with both connections between the upper ends of said struts and said strut housings.

2. An axle beam suspension arrangement for an automotive vehicle as set forth in claim 1, wherein the connection between said panhard rod and the vehicle body member and both the connections between the struts and the strut housings are arranged frontwardly from said axle beam.

3. An axle beam suspension arrangement for an automotive vehicle as set forth in claim 1, wherein the lower ends of the struts are located outside right and left trailing arms disposed on said axle beam.

4. An axle beam suspension arrangement for an automotive vehicle as set forth in claim 1, further comprising right and left trailing arms which are attached at front ends thereof to the rear frame side members and at rear ends thereof to said axle beam, and brake cables which transmit operational force applied from a brake operating means to brake units respectively and which are arranged outside the trailing arms along lengths of the trailing arms respectively.

5. An axle beam suspension arrangement for an automotive vehicle as set forth in claim 1, wherein an exhaust pipe for directing exhaust gas rearward of the vehicle extends through a space defined between said vehicle body member and said panhard rod, and is located between the end of said assist link and one of the rear frame side members.

6. An axle beam suspension arrangement for an automotive vehicle as set forth in claim 1, further comprising a filler tube connected to a fuel tank through a flexible hose and a bracket for retaining said filler tube, said filler tube extending through a space defined among one of the rear frame side members which is arranged at a location opposite said panhard rod with respect to the center line of the vehicle, the vehicle body member, and said axle beam, said bracket supporting a portion adjacent a connection between said filler tube and the flexible hose in a manner wherein one end of the bracket is connected to one of said rear frame side members around a connection to said vehicle body member and the other end thereof to said vehicle body member.

7. An axle beam suspension arrangement for an automotive vehicle as set forth in claim 1, wherein a hydraulic control unit which controls brake hydraulic pressure for the rear wheels according to load of the vehicle is arranged on one of said rear frame side members around a connection to said vehicle body member.

* * * * *